United States Patent
Mysore et al.

(10) Patent No.: US 7,350,308 B2
(45) Date of Patent: Apr. 1, 2008

(54) SLEEVE CONE ANGLE MEASUREMENT SYSTEM

(75) Inventors: Ananda V. Mysore, Sunnyvale, CA (US); Steve G. Gonzalez, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/314,412

(22) Filed: Dec. 20, 2005

(65) Prior Publication Data
US 2007/0137056 A1    Jun. 21, 2007

(51) Int. Cl.
*G01B 5/004* (2006.01)
*G01B 7/008* (2006.01)

(52) U.S. Cl. ...................................................... 33/503

(58) Field of Classification Search .................. 31/503, 31/501, 501.05, 501.45, 532, 613, 645, 531, 31/542, 544.4, 501.14, 832, 501.12, 833, 31/836, 552, 560
See application file for complete search history.

(56) References Cited

U.S. PATENT DOCUMENTS

| | | | | |
|---|---|---|---|---|
| 2,052,153 A | * | 8/1936 | Willis ............................ | 33/501 |
| 2,551,471 A | * | 5/1951 | Snow ............................ | 33/532 |
| 2,825,975 A | * | 3/1958 | Cameron et al. .............. | 33/531 |
| 2,943,394 A | * | 7/1960 | Schabot ........................ | 33/531 |
| 5,125,789 A | * | 6/1992 | Farr ............................. | 414/728 |
| 5,781,450 A | * | 7/1998 | Glasson ........................ | 33/504 |
| 5,822,877 A | * | 10/1998 | Dai .............................. | 33/560 |
| 6,065,220 A | * | 5/2000 | Ohtsuka et al. ............... | 33/549 |
| 6,141,885 A | * | 11/2000 | Ishitani et al. ................ | 33/645 |
| 6,229,297 B1 | * | 5/2001 | Bohn ........................... | 33/503 |
| 7,047,657 B2 | * | 5/2006 | Goeggelmann et al. ....... | 33/552 |
| 2002/0148130 A1 | * | 10/2002 | Ohtsuka ...................... | 33/552 |
| 2002/0152619 A1 | * | 10/2002 | Ito et al. ...................... | 33/1 M |

* cited by examiner

*Primary Examiner*—Christopher W Fulton
(74) *Attorney, Agent, or Firm*—Stephen C. Durant; Novak Druce & Quigg LLP

(57) ABSTRACT

For repeatably and accurately measuring characteristics of workpieces, such angle of taper of a conical cavity defined by a workpiece, examples may include a system having a stage movable in predictable and repeatable increments, and a compliancy fixture. The compliancy feature may include a sapphire to metal interface. Such examples may also include a mechanism, such as an elongate body or an arm, for alternately disposing each of a first object of a first size and a second object of a second size in the conical cavity. Examples may use spherical objects, or portions thereof. Systems further include at least one sensor for determining positions of the first and second objects in the conical cavity and logic for determining the characteristics, such the taper angle, based on the position of the first object and the second object in the conical cavity.

45 Claims, 4 Drawing Sheets

SLEEVE CONE ANGLE MEASUREMENT SYSTEM

BACKGROUND

1. Field

The present invention relates generally to metrology of objects, and more particularly to measuring angles and characteristics of cavities, such as cavities of conical sleeves that may be used in disc drives.

2. Description of Related Art

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density of media has tended to increase and the size of storage systems has tended to decrease. This trend has led to a need for greater precision, which has resulted in tighter tolerancing for components used in disc drives. In turn, achieving tighter tolerances in components requires increased precision in metrology systems for characterizing and parameterizing those components. Measuring angles of objects is one aspect of metrology, and measuring angles of conical cavities is of interest for some disc drive designs.

Metrology systems may include systems that use technology requiring contact with a workpiece as well as systems that obtain metrology data without contacting a workpiece. It is often the case that non-contact systems can be more precise than contact systems, but can be more expensive. Contact based systems can mar workpieces. What is needed is a low-cost, accurate, and repeatable metrology system that may be used for example in metrology of disc drive components.

SUMMARY

In an exemplary aspect, a contact-based metrology system comprises a fixture dimensioned to hold a workpiece, and a first object dimensioned to fit with at least a portion of the workpiece. The system further comprises a first structure mounting the first object to provide for movement of the first object along a path between a start position and an end position for the first object. The first object fits with at least a portion of the workpiece at the end position. The system also comprises a first sensor disposed to sense distance traveled by the first object along the path between the start position and the end position, and to produce a signal indicative of such distance.

In an exemplary aspect, a contact-based metrology method comprises relatively positioning a workpiece and a first object so that the first object may fit with the workpiece upon traveling a path for the first object, moving the first object along the path for the first object, and thereafter determining a position of the first object upon fitting the first object with the workpiece. The method also comprises relatively positioning the workpiece with a second object so that the second object may fit with the workpiece upon traveling a path for the second object. The method also comprises moving the second object along the path for the second object, determining a position of the second object upon fitting the second object with the workpiece. The method also comprises determining, based on the positions of the first object and the second object, a characteristic of the workpiece.

In another exemplary aspect, a contact-based metrology system comprises a stage for supporting a sleeve cone to provide accessibility to an inner cavity of the sleeve cone, a first object with a first size and a second object with a second size. Each of the first object and the second object are coupled to one or more supports for removably disposing each of the first object and the second object to touch a surface of the inner cavity of the sleeve cone. The system also comprises sensor equipment operatively interfacing with the one or more supports. The sensor equipment is for determining a position of the first object and a position of the second object in the inner cavity based on respective positions of the one or more supports. The system also comprises computational logic for deriving an angle of taper of the surface of the inner cavity based on the position of the first object and the position of the second object in the inner cavity. In any aspect or example discussed herein, the first and second objects may be portions of a sphere, entire spheres, or another suitable geometry. In some aspects involving metrology of sleeve cone workpieces, cone quality and cone taper angle may be measured.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in various metrology applications, including metrology of components of motors used in disc storage drives. Metrology equipment employing aspects disclosed herein may be designed and may operate in a number of ways. The exemplary apparatuses and systems provided herein are for illustrating various aspects and are not intended to limit the range of metrology apparatuses and systems in which examples and aspects may be applied.

Figure 1:
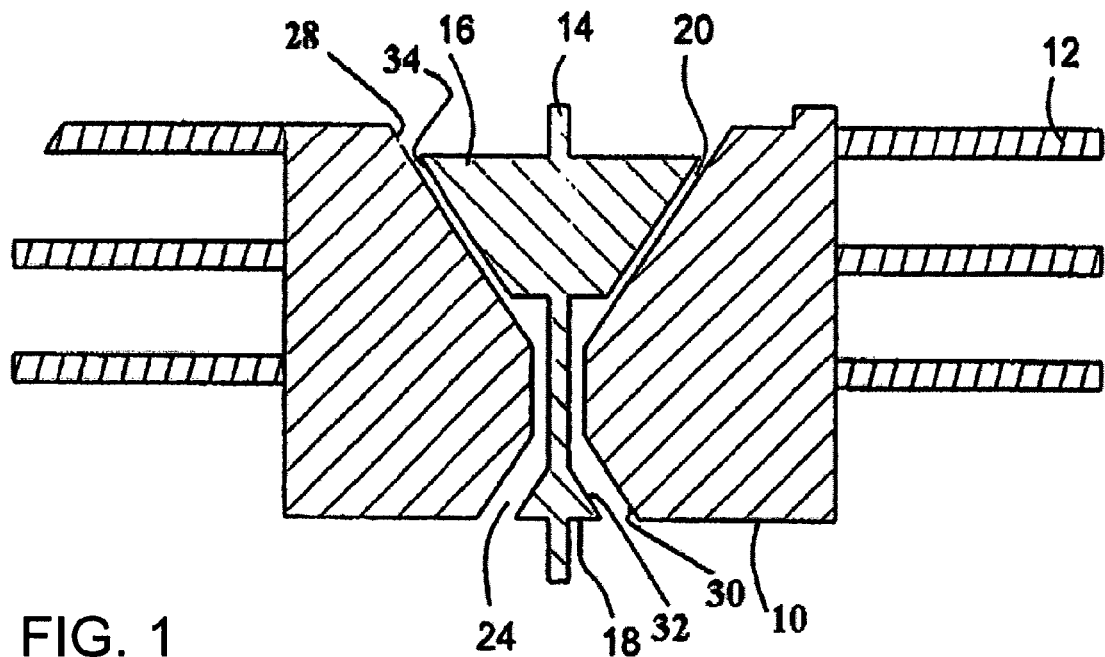
FIG. 1 illustrates a partial section of a hydrodynamic bearing having conical sleeves.

FIG. 1 illustrates a cross-section of a disc drive motor portion. The portion includes a hub 10 supporting discs 12. In operation, the hub 10 rotates about a fixed shaft 14. The fixed shaft 14 includes an upper shaft bearing cone 16 and a lower shaft bearing cone 18. An outer surface 34 of upper shaft bearing cone 16 forms an upper hydrodynamic bearing region 20 with opposing upper conical bearing sleeve 28. An outer surface 32 of the lower shaft bearing cone 18 forms a lower hydrodynamic bearing region 24 with opposing lower conical bearing sleeve 30. For proper operation, there should be an engineered fit between each of the shaft bearing cones 16 and 18 and respectively opposing conical bearing sleeves 28 and 30.

An aspect of this engineered fit is the angle at which the conical bearing sleeves 28 and 30 taper. To continue increasing disc drive performance, the angle at conical bearing sleeves 28 and 30 taper will likely have to be increasingly controlled, for example to within 0.01 degrees or better of an engineered specification. In turn, determining whether conical bearing sleeves 28 and 30 are within 0.01 degrees of specification requires an accurate, and repeatable metrology device and method. Since another factor considered in disc drive production is cost, the metrology device should be low cost. Cost may include such factors as whether the metrology system damages a workpiece being measured, and the speed at which a measurement may be completed. FIGS. 2-6 illustrate systems and methods that may further these goals.

Figure 2:
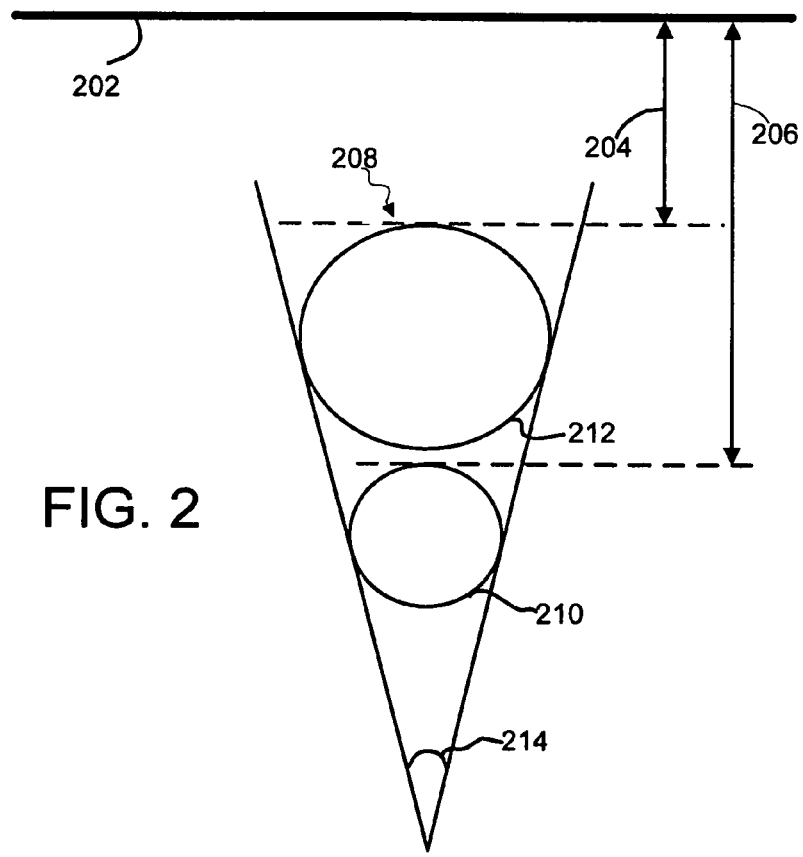
FIG. 2 illustrates a concept of a two ball cone angle measurement technique.

FIG. 2 illustrates aspects of a conceptual method for deriving an angle 2Θ 214 of a conical cavity 208 (shown in cross-section), that may exist for example in a conical bearing sleeve. A first sphere 212 having a known (or determinable) diameter is inserted in the conical cavity 208. A first height 204 associated with positioning of the first sphere 212 is measured. This measurement may be with respect to reference 202. The first sphere 212 may then be removed from conical cavity 208. A second sphere 210 is inserted into the conical cavity 208. A second height 206 associated with positioning of the second sphere 210 is measured; second height 206 may also be a measurement with respect to the reference 202. After obtaining the first height 204 and the second height 206, an angle equal to one half the angle 2Θ 214 may be calculated by application of the formula below, where $R_1$ and $H_1$ and $R_2$ and $H_2$ respectively refer to the radius of the first sphere 212 and the second sphere 210, and the first height 204 and the second height 206.

$$\theta = a\sin\left[\frac{R_1 - R_2}{(H_2 - H_1) - (R_1 - R_2)}\right]^{-1}$$

Figure 3A:
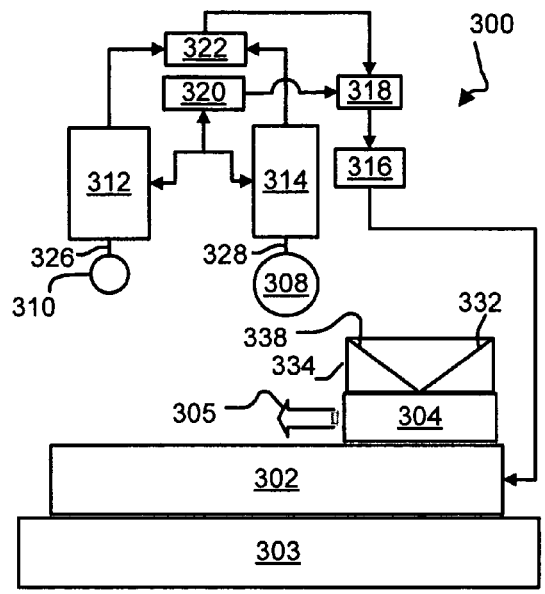
FIGS. 3A-C illustrate a diagram of an exemplary system implementing the two ball cone technique, and in succession the operation of the exemplary system from loading through measurement.
Figure 3B:
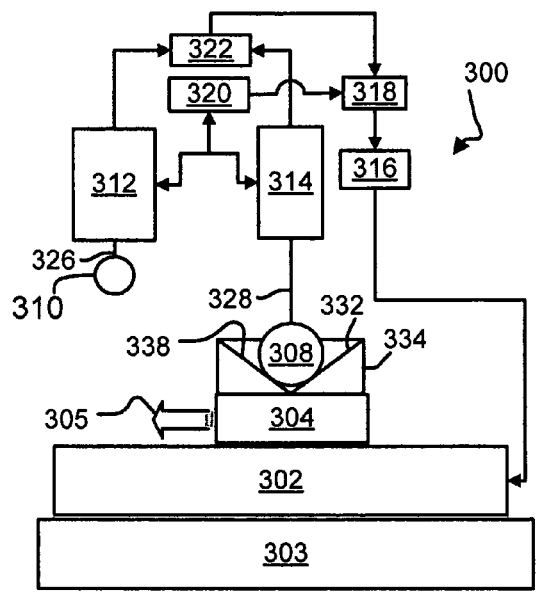
Figure 3C:
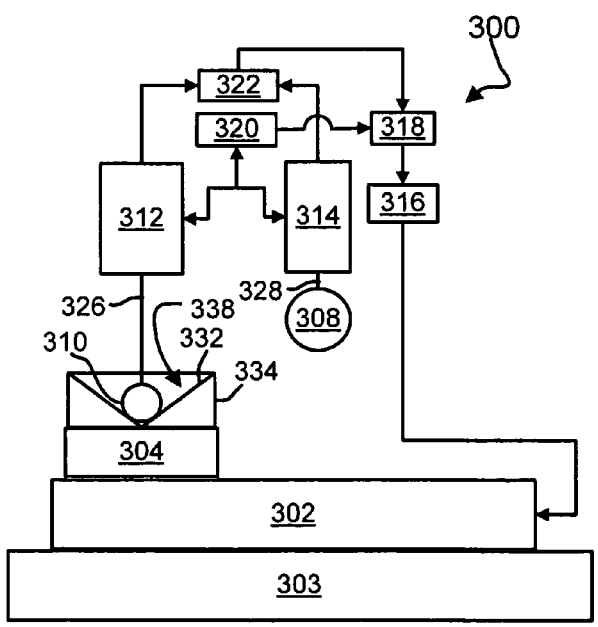

FIGS. 3A-C illustrate schematic aspects of an exemplary metrology system 300 implementing aspects of the above sleeve cone angle measurement strategy. In illustrating these aspects reference is made to sources of inaccuracy and non-repeatability in components of the metrology system 300. These component sources of inaccuracy and non-repeatability combine into a complete measure of the accuracy and repeatability of the metrology system, commonly referred to as Gauge Repeatability and Reproducibility (GRR). Such references are by way of example and not limitation; other metrology systems created and operating by aspects presented herein may have fewer or additional sources of inaccuracy and non-repeatability.

Generally, a lower GRR signifies a more stable metrology device than a higher GRR. GRR has two primary components, repeatability and reproducibility. Repeatability is the ability of the same gauge to provide a consistent measurement during a number of uses by the same operator, and reproducibility is the ability of a gauge to give a consistent measurement regardless of the operator. GRR is typically a measurement of the variability percentage of the total available engineering tolerance for the part. For any given system, a target maximum GRR may be selected, and various parameters may be chosen or modified to avoid exceeding that GRR.

Metrology system 300 includes a supportive base 303 that may be formed from granite or another material that may aid in isolating sensitive components of the metrology system 300 from ambient vibrations or other disturbances. A stage guide 302 is disposed on the supportive base 303. The stage guide 302 provides a track over which a stage 304 may move as illustrated by a movement arrow 305. A fixture 334 is disposed on stage 304 and a workpiece 332 is disposed in the fixture 334. Aspects of the fixture 334 will be further described herein. In exemplary aspects, the workpiece 332 is a sleeve cone. The sleeve cone is disposed in fixture 334 to provide accessibility to a cavity 338 of the sleeve cone, as illustrated in cross-section in FIGS. 3A-C. An outer surface portion of the workpiece 332 may take any number of shapes, for example, the outer portion may be cylindrical, and need not be conically tapered. Fixture 334 may be adapted to accommodate such variations in workpiece 332.

Additional components of the metrology system 300 include a first sphere 308 coupled by a plunger 328 to a first gauge 314, which outputs information to data acquisition logic 322. First sphere 308 is exemplary and other shapes may be used; for example, a hemisphere may also be used as further described herein. The information outputted by the first gauge 314 may include information describing an amount of extension the plunger 328. The amount of extension may in turn be used as an indicium of a position of the first sphere 308 in workpiece 332. This indicium of position may be viewed or otherwise interpreted into a height of the first sphere 308 with respect to a reference, in keeping with the conceptual illustration of FIG. 2.

The metrology system 300 also includes a second sphere 310 coupled by a second plunger 326 to a second gauge 312. The second gauge 312 also outputs information that may include information describing an amount of extension of the second plunger 326. The amount of extension may in turn be used as an indicium of a position of the second sphere 310 in workpiece 332. This indicium of position may be viewed or otherwise interpreted into height information of the second plunger 326 with respect to the reference. The amount of extension may be transmitted to the data acquisition logic 322. Other examples may include any amount of preprocessing of extension information. In other aspects ways other than plungers to extend and retract first sphere 308 and second sphere 310, such as use of rotatable arms, may be employed.

The data acquisition logic in turn communicates with a central processing unit 318. The central processing unit 318 interfaces with gauge controller 320 which controls aspects of both the first gauge 314 and the second gauge 312 discussed below. The central processing unit 318 also interfaces with stage controller 316. Stage controller 316 interfaces with the stage guide 302 and controls movement and positioning of the stage 304. Aspects of the metrology system 300 are further illustrated in FIGS. 3B-C.

FIG. 3A illustrates that stage 304 moves in an exemplary direction indicated by movement arrow 305, and that this movement is initiated by central processing unit 318 controlling the stage through the stage controller 316. FIG. 3B illustrates that stage 304, by direction from the central processing unit 318, positions the workpiece 332 substantially under first sphere 308. In addition, the central processing unit 318 has directed the first gauge 314 to extend first plunger 328 for contacting first sphere 308 to workpiece 332. Based on an amount of extension of the first plunger 328, indicium of a position of the first sphere 308 in the workpiece are determined. Such indicium may include (or may be expressed as) a height of the first sphere 308 with respect to a reference.

FIG. 3C illustrates that first sphere 308 has been retracted and that the stage 304 has moved the workpiece 332 substantially under the second sphere 310. FIG. 3C also illustrates that the second gauge 312 has extended the second plunger 326 so that second sphere 310 contacts the workpiece 332. As described above, these actions may be initiated by central processing unit 318 providing commands or other information to gauge controller 320 and to stage controller 316. Based on an amount of extension of the second plunger 326, indicium of a position of the second sphere 310 in the workpiece are determined. Such indicium may include (or may be expressed as) a height of the second sphere 310 with respect to a reference.

Gauges 314 and 312 may include sensors for determining an amount of extension of the first and second plungers 328, 326. For example, such sensors may include interferometry sensors and associated supporting equipment. Exemplary gauges that may be used include Heidenhain Metro 1287 gauges.

In exemplary aspects, the stage controller 316 and the plunger controller 320 interface respectively with the stage 304 and the first and second gauges 314, 312 at least partially pneumatically. For example, the first and second gauges 314, 312 may each include plunger controls that interface with plunger controller 320 through pneumatic control lines. By applying air pressure through the pneumatic control lines, plunger controller 320 may initiate extension of the first and second plungers 328, 326.

By applying vacuum to those pneumatic control lines, plunger controller 320 may also slow extension of, and retract, the first and second plungers 328, 326. Retraction and slowing may also be initiated by spring mechanisms associated with the plunger controls. A rate at which the first and second plungers 328, 326 may extend may be controlled to prevent damage to workpiece 332. Timing of slowing extension of the first and second plungers 328, 326 may be controlled to allow rapid extension, and then slowing at a time before contact with workpiece 332. An amount of pressure (vacuum or greater than ambient) and/or volume of gas may be selectable based on the weights of the plungers 328 and 326 and first and second spheres 308, 310.

In a general sense, aspects described in FIGS. 3A-C include fixture 334 dimensioned to hold a workpiece (e.g., workpiece 332) and a first object (e.g., first sphere 308) that is sized to at least fit a portion of the workpiece that is the subject of metrology. The nature of this fit may vary depending on characteristics of the portion of the workpiece subjected to metrology and characteristics of the first object, including size and shape of each.

Also, first plunger 328 is an example of a structural portion for mounting the first object to provide for movement of the first object along a path that results in contact with the workpiece 332. This path, between various metrology uses, need not have precisely the same starting point or ending point, but this path would be expected to lead to contact with the workpiece 332. This path may be predetermined based on the arrangement of the structural portion.

Similarly, plunger controller 320 may be generally viewed as a position controller for the structural portion for mounting the first object. As such, there may be a separate position controller for the first object structural portion and the second object structural portion. Functionality and/or functional portions of each position controller may also be distributed. For example, pneumatic valving, motors, or other actuators may be included proximate the structural portion, circuitry for controlling that valving may be at a separate location, and computation logic for controlling the circuitry may be at yet another location.

Upon contact, the first object fits with the workpiece at a portion of the workpiece determined by interaction between sizes and shapes of the first object and the workpiece. First gauge 314 is an example of a sensor that can be viewed as sensing a distance traveled by the first object along the path and producing a signal indicative of such distance.

Also, control related aspects and associated apparatuses, such as stage controller 316, data acquisition logic 322, plunger controller 320, control system 250 and the like may be implemented in any of a variety of ways that provide a variety of divisions between mechanical control (e.g., valving, timing, cams, gears, and other devices useful in constructing mechanical apparatuses) and electronic control, between software control running on general purpose processors and application specific hardware implemented in ASICS, FPGAs or other suitable logic implementations. Aspects relating to second sphere 310, second plunger 326, second gauge 312, and the like may similarly be generalized.

Figure 4:
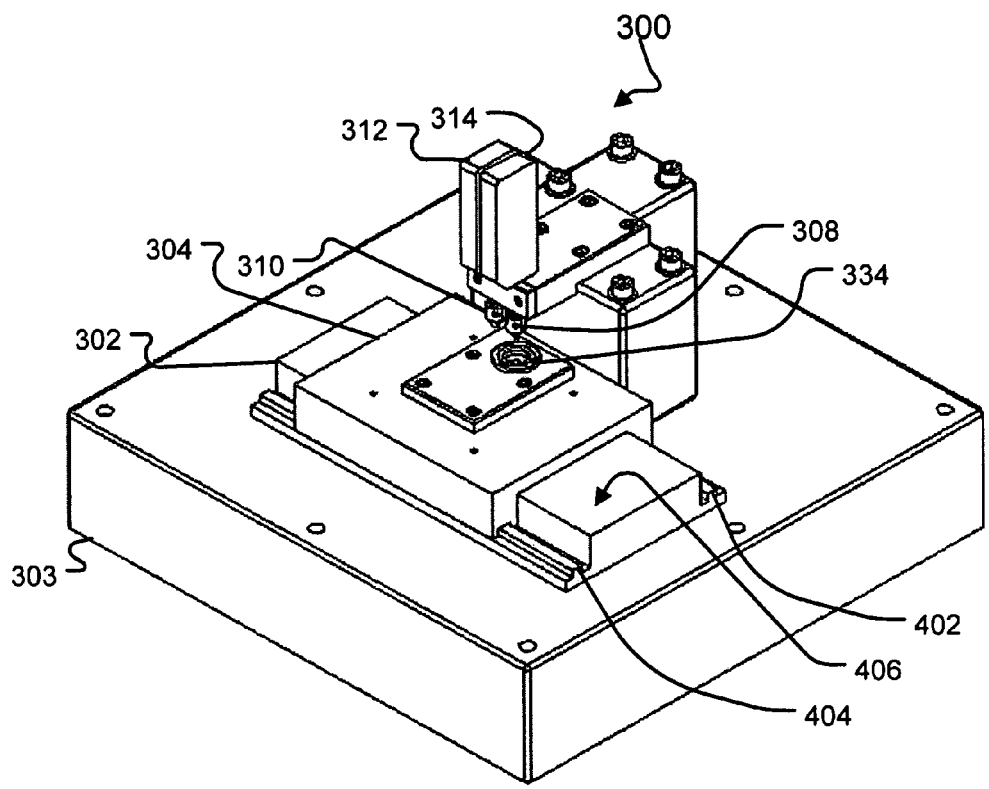
FIG. 4 illustrate a perspective view of the exemplary system.

FIG. 4 illustrates a perspective view of an example implementation of metrology system 300. Base 303 supports stage guide 302. Stage guide 302 includes a first rail 402, a second rail 404, and a top portion 406. The stage 304 interfaces with first rail 402 and second rail 404, which provide guidance to stage 304 as it moves along the stage guide 302. The stage 304 also fits closely to the top portion 406, which is expected to aid in reducing variation of distance between a workpiece 332 disposed in fixture 334 and gauges 314, 312. By reducing variation, the stage is expected to increase accuracy and repeatability because changes in amount of extension of plungers 328, 326 due to such variations would be reduced, and therefore measurement error and variations between measurements would be reduced.

The stage 304 may be an air bearing stage with a relatively small positioning error and a motion control system that can provide approximately constant velocity. Air bearing stages also help lower error because they tend to distribute load over a large surface area and often have good stiffness which is often desirable for heavy or offset loading. Also, the air bearing of an air bearing stage has an inherent averaging effect that helps in error reduction by filling small surface voids and other irregularities, which is thought to provide better pitch, roll, yaw, and straightness and flatness specifications. An exemplary air bearing stage is the ABL 1000 (FiberGlide 1000) manufactured by Aerotech.

Figure 5:
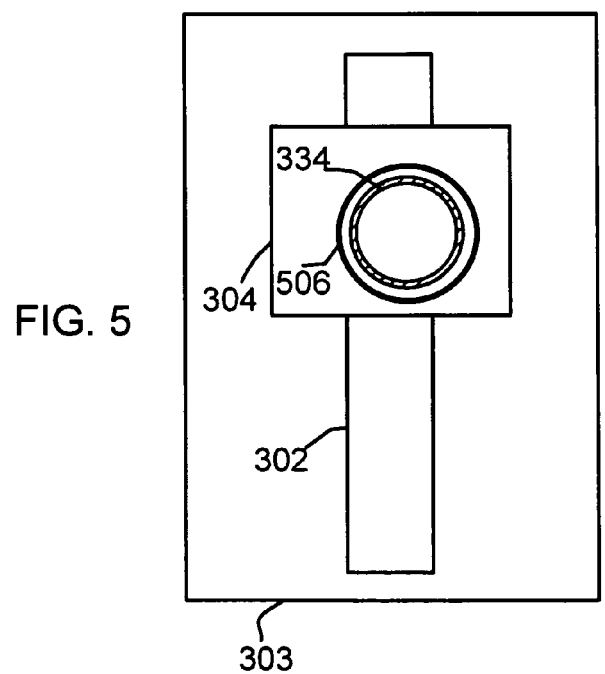
FIG. 5 illustrates a stage component and fixture coupled with the stage component of the system.

FIG. 5 provides a top view of portions of metrology system 300. Base 303 again supports stage guide 302 on which stage 304 moves. Fixture 334 is illustrated as a ring that is placed within a compliancy boundary 506. The compliancy boundary 506 defines a surface over which fixture 334 may move under application of force on workpiece 332 (held by fixture 334—FIGS. 3A-C) by first sphere 308 or second sphere 310 as each contact workpiece 332. The surface may be steel and may further be finished to be relatively smooth. In present examples, workpiece 332 includes a conical cavity. Although stage 304 may approximately align a bottom of the conical cavity under each of first sphere 308 and second sphere 310, there may also be some misalignment, and the first sphere 308 and second sphere 310 may each initially contact workpiece 332 at a point that is not as low in the conical cavity as each sphere may reach.

Getting each of first sphere 308 and second sphere 310 as low as possible in the conical cavity of workpiece 332 may increase accuracy of cone angle measurement. Therefore, providing for movement of the fixture 334 allows for correction of misalignment because the first sphere 308 and second sphere 310 tend to exert some force horizontally (as well as vertically) when resting on workpiece 332. By providing an interface (e.g., an interface between a surface of compliancy boundary 506 that faces a bottom of fixture 334 in FIG. 5) having a coefficient of friction low enough to allow movement of fixture 334 under that horizontal force, the workpiece 332 may find a lower position in the conical cavity.

Aspects of metrology system 300 that affect an allowable approximate maximum friction coefficient include vertical force of the sphere/plunger combination on the workpiece, friction forces at the sphere/workpiece interface, and angle of contact between the sphere and the workpiece. In an example, the workpiece 332 is formed from steel and the surface defined by compliancy boundary 506 is formed from sapphire. A metal-sapphire surface has a coefficient of friction of about 0.1-0.15. In another example, the workpiece 332 is supported by a sapphire ring (e.g., fixture 334) having a bottom portion resting on a steel surface defined by compliancy boundary 506. In this example, the sapphire ring glides along the steel surface. Rings of various sizes may be selected for different workpieces. Shapes other than rings may also be used; for example discs, or blocks may be used. By further example, an inner portion of a shape may be a ring, but an outer portion may be any other shape such as a square, or a hexagon.

Thus, compliance aspects described herein include selecting materials to provide an interface with an appropriately low coefficient of friction, where the interface is between either a workpiece and a support (e.g., the surface of compliancy boundary 506) or between a body (e.g., the ring example of fixture 334) accepting the workpiece and a support. Of course, such compliance aspects may be combined or otherwise modified. Other ways to achieve compliance are contemplated in other aspects. For example, compliance may be added to a mechanism for supporting the first and the second spheres.

The above examples and aspects presented used, for ease of description, spheres for objects contacting workpiece 332. In other aspects, any of a variety of objects having other shapes may be used. For example, hemispheres and discs may be used rather than spheres. Still further aspects may use any object having a geometry from which a position of the object in a conical sleeve may be used in combination with a position of a differently sized object in the conical sleeve to calculate a characteristic, such as a taper angle of a surface in the conical sleeve. Other characteristics may include cone angle quality.

Figure 6:
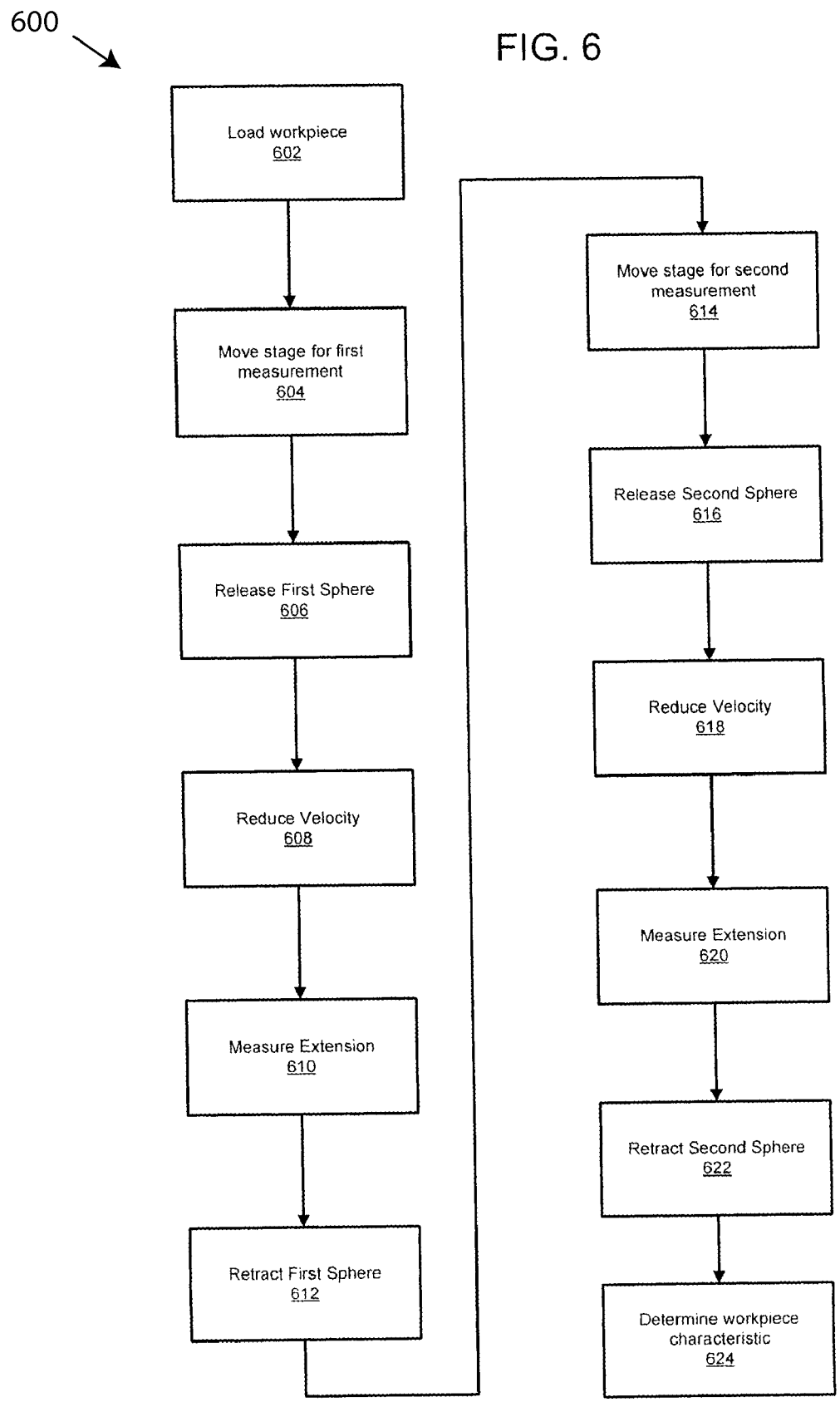
FIG. 6 illustrates exemplary method steps in the operation of the system.

FIG. 6 presents an exemplary metrology method 600 (described with reference to FIGS. 3A-C). At 602, workpiece 332 is loaded into fixture 334. At 604, stage 302 moves approximately under first sphere 308 for obtaining a first measurement. At 606, first sphere 308 is released for contacting workpiece 332. At 608, a velocity of the first sphere 308 is reduced. As first sphere 308 begins contacting workpiece 332, workpiece 332 may move by sliding on a low friction surface (e.g., the surface of compliancy boundary 506) or may slide with a low friction support such as fixture 334 on a surface. At 610, an amount of extension of first plunger 328 is measured, and used as an indicium of position of first sphere 308 in the workpiece 332 (e.g., indicium may include a height of first sphere 308 with respect to a reference as discussed previously). At 612, first sphere 308 is retracted, at 614 stage 304 is moved substantially under second sphere 310, and at 616 second sphere 310 is released. At 618, a velocity of the second sphere 310 is reduced. At 620, an amount of extension of second plunger 326 is measured, and used as an indicium of position of second sphere 310 in the workpiece 332. At 622, second sphere 310 is retracted. At 624, a characteristic, such as an angle of taper of the conical cavity of exemplary workpiece 332 is calculated based on the indicia of respective positions of first sphere 308 and second sphere 310 in workpiece 332.

An additional aspect that may aid in improving accuracy and repeatability is to cause first and second spheres 308, 310 to contact the surface of workpiece 332 at various relative orientations for a number of metrology cycles. By example, first and second spheres 308, 310 may each be rotated through some portion of a complete revolution after completion of a cycle. Then another cycle may be commenced. Because first and second spheres 308, 310 have each been rotated through a portion of a revolution, first and second spheres 308, 310 will each contact the surface of workpiece 332 at a different relative orientation than each did previously. Where there is some deformity in one or more of first sphere 308 and second sphere 310 and the surface of workpiece 332, rotating in this manner may help average measurements to minimize the effect of those deformities on accuracy and repeatability. Workpiece 332 may also be rotated to accomplish a similar result.

This description is exemplary and it will be apparent to those of ordinary skill in the art that numerous modifications and variations are possible. For example, various exemplary methods and systems described herein may be used alone or in combination with various other metrology systems, control mechanisms including program code, data collection, data visualization techniques, and the like. Various additional steps may be added to methods, including rotating of workpieces for obtaining measurements at different orientations which may improve accuracy or may be for assessing other workpiece characteristics. Additionally, particular examples have been discussed and how these examples are thought to address certain disadvantages in related art. This discussion is not meant, however, to restrict the various examples to methods and/or systems that actually address or solve the disadvantages.

We claim:

1. A contact-based metrology system comprising:

a stage;

a fixture dimensioned to hold a workpiece and slidably mounted on the stage;

a first object dimensioned to fit with at least a portion of the workpiece;

a first structure mounting the first object, the mounting providing for movement of the first object along a path between a start position and an end position for the first object such that during a measurement the fixture is moveable in reaction to the movement of the first object and the fixture permits the first object to fit with at least a portion of the workpiece at the end position; and a first sensor disposed to sense distance traveled by the first object along the path between the start position and the end position, and to produce a signal indicative of such distance.

2. The metrology system of claim 1, wherein
the first structure includes a first plunger, the first object includes a generally spherical portion, and the first sensor senses an amount of extension of the first plunger for sensing the distance traveled by the first object along the path between the start position and the end position for the first object.

3. The metrology system of claim 2, further comprising:
a second object dimensioned to fit with at least a portion of the workpiece;
a second structure mounting the second object, the mounting providing for movement of the second object along a path between a start position and an end position for the second object such that the fixture is moveable in reaction to the movement of the second object and the fixture permits the second object to fit with at least a portion of the workpiece at the end position for the second object;
a second sensor disposed to sense distance traveled by the second object along the path between the start position and the end position for the second object, and produce a signal indicative of such distance; and
computational logic for determining indicia of respective positions of the first object and the second object as each of the first object and the second object fits with the workpiece.

4. The metrology system of claim 3, wherein the fixture is translatable relative to the first object and the second object for permitting each of the first object and the second object to alternately fit with the workpiece at respective end positions of the first object and the second object.

5. The metrology system of claim 3, wherein the indicia of the positions of the first object and the second object include respective heights for the first object and the second object described with respect to a reference.

6. The metrology system of claim 3, wherein the workpiece is a sleeve cone, and further comprising computational logic operable to calculate an angle of the sleeve cone from the indicia of the respective positions of the first object and the second object.

7. The metrology system of claim 3, wherein the second structure includes a second plunger, the second object includes a generally spherical portion, and the second sensor senses an amount of extension of the second plunger for sensing the distance traveled by the second object along the path between the start position and the end position for the second object.

8. The metrology system of claim 7, further comprising control logic interfacing with a position controller for the first structure, and a position controller for the second structure, the control logic operable to initiate movement of the first object and the second object along respective paths.

9. The metrology system of claim 8, wherein the control logic is further operable to initiate retraction of the first plunger and the second plunger after sensing respective distances traveled by the first object and the second object.

10. The metrology system of claim 8, wherein the control logic interfaces with the position controller for the first structure and the position controller for the second structure at least partially pneumatically.

11. The metrology system of claim 8, wherein the control logic provides for slowing movement of the first object before contact between the first object and the workpiece by application of vacuum through pneumatic control lines interfacing the control logic with the first position controller.

12. The metrology system of claim 1, wherein the workpiece may move relative to the first object in response to contact by the first object, the movement in a direction generally transverse to a direction of travel of the first object along the path for the first object.

13. The metrology system of claim 1, further comprising a compliancy feature that allows movement of the fixture relative to the stage.

14. The metrology system of claim 13, wherein the compliancy feature includes a sapphire portion of the fixture that interfaces with a steel portion of the stage.

15. A contact-based metrology method, comprising:
relatively positioning a workpiece and a first object, so that the first object may fit with the workpiece upon traveling a path for the first object;
moving the first object along the path for the first object while permitting the workpiece to move relative to the first object in reaction to the first object;
determining a position of the first object upon fitting the first object with the workpiece;
relatively positioning the workpiece with a second object, so that the second object may fit with the workpiece upon traveling a path for the second object;
moving the second object along the path for the second object;
determining a position of the second object upon fitting the second object with the workpiece; and
determining, based on the positions of the first object and the second object, a characteristic of the workpiece.

16. The metrology method of claim 15, wherein
determining a position of the first object includes determining a height of the first object with respect to a reference,
determining a position of the second object includes determining a height of the second object with respect to the reference, and
the determined characteristic of the workpiece includes an angle of taper of a conical cavity defined by the workpiece.

17. The metrology method of claim 15, wherein
moving the first object includes extending a first plunger coupled to the first object, and
moving the second object includes extending a second plunger coupled to the second object.

18. The metrology method of claim 15, wherein moving the first object includes slowing the first object before the first object contacts the workpiece.

19. The metrology method of claim 15, wherein moving the first object comprises:
initiating movement by application of air pressure by control logic to a controller of a structure supporting the first object, and
slowing the first object by application of vacuum to the controller.

20. A method for forming a disc drive motor including the metrology method of claim 15, and further comprising: determining that the characteristic of the workpiece is within a specification, and positioning the workpiece in the motor if the characteristic is within the specification.

21. The contact metrology method of claim 15 wherein permitting the workpiece to move relative to the first object includes sliding the workpiece.

22. The contact-based metrology method as in claim 21 wherein sliding the workpiece includes translating the workpiece.

23. The contact-base metrology method as in claim 21 wherein permitting the workpiece to move relative to the first object includes moving a fixture supporting the workpiece.

24. The metrology method of claim 15 wherein moving the second object includes permitting the workpiece to move relative to the second object in reaction to the moving of the second object.

25. A contact-based metrology system comprising:
a slidable stage for supporting and positioning a sleeve cone to provide accessibility to an inner cavity of the sleeve cone;
a first object with a first size and a second object with a second size, each of the first object and the second object coupled to one or more supports for removably disposing each of the first object and the second object to touch a surface of the inner cavity of the sleeve cone such that the slidable stage is movable relative to the first object and the second object in reaction to the first object and the second object touching the surface of the inner cavity;
sensor equipment operatively interfacing with the one or more supports, the sensor equipment for determining a position of the first object and a position of the second object in the inner cavity based on respective positions of the one or more supports; and
computational logic for deriving an angle of taper of the surface of the inner cavity based on the position of the first object and the position of the second object in the inner cavity.

26. The contact-based metrology system of claim 25 wherein the slidable stage is a translatable stage.

27. A contact-based metrology system measuring a conic surface, the contact-based metrology system comprising:
a stage having a stage surface;
a fixture slidably mounted to the stage and having a fixture surface in contact with the stage surface forming an interface therebetweeen wherein the fixture is dimensioned to support a workpiece; and
a first object moving in a first direction to contact the workpiece such that when the first object contacts the workpiece, the workpiece is permitted to move in reaction to the contact by the first object.

28. The contact-based metrology system of claim 27 wherein the stage surface is approximately perpendicular to the first direction such that the workpiece is allowed to move in a reaction direction approximately parallel to the stage surface.

29. The contact-based metrology system of claim 27 wherein the stage includes a compliancy feature limiting movement of the workpiece on the stage surface.

30. The contact-based metrology system as in claim 29 wherein the compliancy feature is a compliancy boundary defining the stage surface.

31. The contact-based metrology system as in claim 27 wherein the interface is a low friction interface.

32. The contact-based metrology system as in claim 31 wherein the interface has a coefficient of friction of the interface is less than about 0.20.

33. The contact-based metrology system as in claim 32 wherein the at least one of the stage surface and the fixture surface includes a metal.

34. The contact-based metrology system as in claim 33 wherein the metal is steel.

35. The contact-based metrology system as in claim 34 wherein at least one of the stage surface and the fixture surface includes sapphire.

36. The contact-based metrology system as in claim 32 wherein at least one of the stage surface and the fixture surface includes sapphire.

37. The contact-based metrology system as in claim 27 wherein the first object has a rounded surface that contacts the workpiece.

38. The contact-based metrology system as in claim 37 wherein the rounded surface is a portion of a spherical surface.

39. A contact-based metrology system measuring a conic surface, the contact-based metrology system comprising:
a fluid bearing stage adapted to support a workpiece;
a first object adapted to fit a portion of the workpiece and moving in a first direction to contact the workpiece such that when the first object contacts the workpiece, the fluid bearing stage aligns the workpiece to the first object to obtain a measurement of the workpiece.

40. The contact-based metrology system as in claim 39 wherein the fluid bearing stage is an air bearing stage.

41. The contact-based metrology system as in claim 39 wherein the fluid bearing stage includes:
a base; and
a fixture adapted to support the workpiece and slidably mounted on the base.

42. The contact-based metrology system as in claim 41 wherein the base has a base surface and the fixture has a fixture surface in contact with the base surface.

43. The contact-based metrology system as in claim 42 wherein the base surface is defined by a compliancy feature which limits movement of the fixture on the base surface.

44. The contact-based metrology system as in claim 43 wherein the compliancy feature is a compliancy boundary.

45. The contact-based metrology system as in claim 44 wherein the compliancy boundary defines the base surface.

* * * * *